(12) United States Patent
Nylander et al.

(10) Patent No.: US 9,376,624 B2
(45) Date of Patent: Jun. 28, 2016

(54) METHOD FOR PRODUCING FUEL FROM ORGANIC MATERIAL AND A GASIFICATION PLANT

(76) Inventors: Timo Nylander, Lohja (FI); Sami Nylander, Lohja (FI)

(*) Notice: Subject to any disclaimer, the term of this patent is extended or adjusted under 35 U.S.C. 154(b) by 548 days.

(21) Appl. No.: 13/817,542

(22) PCT Filed: Aug. 18, 2011

(86) PCT No.: PCT/FI2011/050726
§ 371 (c)(1),
(2), (4) Date: Apr. 9, 2013

(65) Prior Publication Data
US 2013/0205653 A1 Aug. 15, 2013

(30) Foreign Application Priority Data
Aug. 20, 2010 (FI) .................................. 20105867

(51) Int. Cl.
| | |
|---|---|
| C10B 53/02 | (2006.01) |
| C10B 49/02 | (2006.01) |
| C10B 53/00 | (2006.01) |
| C10K 1/02 | (2006.01) |
| C10J 3/02 | (2006.01) |
| F23G 5/027 | (2006.01) |

(52) U.S. Cl.
CPC .............. *C10B 53/02* (2013.01); *C10B 49/02* (2013.01); *C10B 53/00* (2013.01); *C10J 3/02* (2013.01); *C10K 1/02* (2013.01); *F23G 5/027* (2013.01); *C10J 2300/0916* (2013.01); *C10J 2300/0946* (2013.01); *C10J 2300/1815* (2013.01); *C10J 2300/1823* (2013.01); *Y02E 50/14* (2013.01); *Y02P 20/145* (2015.11); *Y02P 30/20* (2015.11)

(58) Field of Classification Search
CPC ... C10B 49/02; C10B 53/00; C10J 2300/1823
See application file for complete search history.

(56) References Cited

U.S. PATENT DOCUMENTS

| | | |
|---|---|---|
| 4,260,473 A | 4/1981 | Bauer |
| 2010/0162625 A1* | 7/2010 | Mills ........................ C10J 3/485 48/76 |

*Primary Examiner* — Matthew Merkling
(74) *Attorney, Agent, or Firm* — Seppo Laine Oy

(57) ABSTRACT

The invention relates to a method for producing fuel from organic waste or biomass in a gasification process comprising the burning of organic waste or biomass and the recovery of the gasification residue. The method comprises at least the following steps: organic aqueous waste or biomass (M; M1) is fed in a combustion chamber (1); oxygen-bearing pressurized regeneration gas (G) is also fed in said combustion chamber (1); a continuous, pressurized combustion process is maintained in the combustion chamber, without adding an external oxygen source or heat in the process, so that the combustion of organic waste or biomass is carried out with the oxygen content of 0.1-1 of the stoichiometric oxygen content, as the oxygen maintaining the combustion and the overpressure and heat created in the combustion chamber (1) are completely derived from the pyrolysis of the regeneration gas and/or from the pyrolysis of the aqueous organic waste or biomass (M; M1) fed in the combustion chamber, and from the gasification reactions between the supplied material (M1) and the regeneration gas (G); ash (A) created in the continuous gasification process taking place in the combustion chamber (1) is removed and combustion gases obtained from the gasification process, together with solid particles contained in the combustion gases, are conducted to a separation process; in the separation process, the temperature of the combustion gas (S) is dropped below the flash point (Fp) of the compounds contained in the combustion gas and below the water condensation point, the condensation water (W) contained in the combustion gas (S) removed, the liquid fuel (M; M4) is recovered from the combustion gas (S) and the regeneration gas (G) contained in the combustion gas is completely or partly conducted back to the combustion chamber (1).

11 Claims, 2 Drawing Sheets

METHOD FOR PRODUCING FUEL FROM ORGANIC MATERIAL AND A GASIFICATION PLANT

The invention relates to a method according to the preamble claim 1 for producing fuel from aqueous organic material in a gasification process comprising the burning of organic material and the recovery of the gasification residue.

DESCRIPTION OF THE PRIOR ART

Many different processes, based on the burning of material have been developed for recovering the energy contained in organic material, such as biomass and organic waste. One such method is a gasification process taking place in the presence of oxygen or air, in which process the source material is partly burned, and as a result, there is obtained combustion gas containing fluid tar-like substances and combustible gas. Generally the focus in the prior art has been the optimization of the composition of the gas phase and yield, and the creation of methane and hydrogen bearing fuel gases that can be further used in energy production. In cases where the precise aim has been to recover the tar-like fraction from biomass or organic waste, the starting point has mainly been the recovery of valuable metallic substances contained in the source materials, the recovery of impurities or the recovery of certain combustible fractions contained in the tar-like substances.

In this connection the term 'organic material' refers to hydrocarbon-based materials and substances, such as biomass, organic waste and synthetically produced substances, such as plastic.

Here the term 'organic waste' refers to household and industrial waste with an organic (biogenic) origin, such as foodstuff waste, as well as cellulose-based packaging material waste.

Here the term 'biomass' refers to organic material derived from nature, such as manure, wood, parts of plants and chopped harvesting waste obtained from wood or bark, as well as hay, and slurries from forest industry.

In the prior art, there are some descriptions of processes where a fraction separated from combustion gas has been refined to fuel, but these are without exception realized with a rapid pyrolysis of biomass or waste, and this requires a large quantity of external energy to be fed in the process. This type of process is described in the patent publication U.S. Pat. No. 4,260,473, relating to a pyrolytic reaction of solid organic waste, where the source material is dried or a pyrolyzed rapidly by means of an external energy source to be added in the process. From combustion gases, there are recovered, by means of a multi-step reaction, several fractions suitable to be used as fuel, and the inert gas (carrier gas) contained in the combustion gas is recycled back to the combustion chamber. The drawbacks in a process of this type are a large demand for external energy, as well as a complicated separation process.

GENERAL DESCRIPTION OF INVENTION

With the above described prior art as a starting point, the objective of the applicant was to create a simple process for treating organic material, particularly biomass or organic waste, in which organic material is burned, and the fraction that is suitable for fuel is in a simple process separated from the obtained combustion gas. Another object of the invention was to create an organic material treating process with a positive energy balance.

Moreover, the object of the invention was to realize a method and a plant applying said method, by means of which many different types of organic material, including, aqueous, dry, solid and liquid waste or biomass, can be processed without pretreatment.

The objects of the above invention are realized by a method according to claim 1.

The method according to the invention for producing fuel from organic material in a gasification process comprises the burning of organic material and the recovery of the gasification residue. The method includes at least the following steps:

organic aqueous material is fed in a combustion chamber;

oxygen-bearing pressurized regeneration gas is also fed in said combustion chamber;

a pressurized, continuous combustion process is maintained in the combustion chamber without adding an external oxygen source or heat in the process, so that the gasification of organic material is carried out with the oxygen content of 0.1-1 of the stoichiometric oxygen content, as the oxygen maintaining the combustion and the overpressure and heat created in the combustion chamber are completely derived; from the pyrolysis of the regeneration gas and/or the aqueous organic waste fed in the combustion chamber, and from the gasification reaction between the supplied material and the regeneration gas;

ash created in the continuous gasification process taking place in the combustion chamber is removed, and combustion gases obtained from the gasification process, together with solid particles contained in the combustion gases, are conducted to a separation process;

in the separation process, the temperature of the combustion gas is dropped below the flash point of the compounds contained in the combustion gas and below the water condensation point, the condensation water contained in the combustion gas is removed, the liquid fuel is recovered from the combustion gas and the regeneration gas contained in the combustion gas is completely or partly conducted back to the combustion chamber.

Now a gasification plant according to the invention includes a gas-tight combustion chamber, means for feeding aqueous organic material to the combustion chamber and means for removing ash from the combustion chamber. In addition, the gasification plant includes an elongated combustion gas pipe connected to the combustion chamber for conducting combustion gas out of the combustion chamber, wherein the length and diameter of the combustion gas pipe are such that the combustion gases are cooled down to a temperature that is below the flash point of the compounds contained in the combustion gas, and at that end of the combustion gas pipe that is contrary to the combustion chamber, there is connected a water recovery element for condensing and collecting the free water contained in the combustion gas, and moreover, that area of the combustion gas pipe that is contrary to the combustion chamber is provided with a number of apertures, through which the combustion gas can flow to outside of the combustion gas pipe, being at the same time separated as regeneration gas and solid fuel, and a fuel recovery element connected to said combustion gas pipe, and a tank for the regeneration gas provided with gas inlet and feed pipes, through which at least part of the regenerated gas can be conducted as pressurized back to the combustion chamber.

A gas-tight fuel chamber means that the housing of the combustion chamber, as well as the connected conduits for the combustion gas pipe, the feed elements, the regeneration gas feed pipe and the ash removal chamber are sufficiently well sealed, so that a permanent overpressure can be arranged inside the combustion chamber.

The basic principle of the invention is to burn aqueous organic materials, such as aqueous organic waste or biomass in the presence of insufficient, i.e. non-stoichiometric, oxygen content, and to treat the obtained combustion gas in a two-step process for separating water, aqueous fuel and regeneration gas. When the burning takes place in the presence of non-stoichiometric oxygen content, ample amounts of oxygenous gases (for example carbon monoxide) are left in the created combustion gases. When the oxygenous regeneration gases separated from the combustion gas are recycled back to the gasification process, the temperature of the exothermic gasification combustion (i.e. smoldering) rises sufficiently (over about 500° C.) in order to facilitate an automatic continuity for the reaction, and a separate external energy source is not needed. The combustion gas separation prowess is simple: the temperature of the combustion gas dropped so low that the water contained therein is condensed and can be removed through the other end of the pipe. As for the tar-like aqueous slurry contained in the combustion gases and the oxygenous gas-like fraction, they are both removed through small apertures provided in the pipe. The aqueous slurry has a good fuel value.

Here the term insufficient, i.e. non-stoichiometric oxygen content, means that the oxygen quantity present in the combustion chamber is not sufficient for a complete combustion of the pyrolytic products (pyrolytic gases, ash content) created of the material fed therein. The material is burned incompletely by smoldering.

The gasification process according to the invention includes the following steps:

A pyrolytic step, where a carbonaceous source material (organic material) is broken up, and therefrom are volatilized volatile gaseous substances that either burn in the successive step or are transferred directly in the combustion gas. Among the products created in the pyrolytic step are: (water) vapor, $H_2$, $N_2$, $O_2$, $CO_2$, CO, alkanes, hydrocarbons, carbonyls such as acids, $NH_3$, $H_2S$, unsaturated hydrocarbons, olefines, aromatic hydrocarbons such as phenols, carbon and ash.

In incomplete combustion, the carbon source C of organic material, together with oxygen, produce carbon dioxide and carbon monoxide at varying proportions, depending on the quantity of oxygen present in the reaction:

$$C+O_2 \rightarrow CO_2 \quad (1a) \text{ and}$$

$$C+0.5O_2 \rightarrow CO \quad (1b)$$

In the combustion reaction, the generation of carbon monoxide produces the energy needed in the gasification step. In the gasification step, the carbon source (C) reacts with carbon dioxide and water vapor according to the following reaction:

$$C+H_2O \rightarrow H_2+CO \quad (2)$$

When equations (1b) and (2) are summed up, we get:

$$2C+H_2O+0.5O_2=2CO+H_2 \quad (2b)$$

which is a slightly exothermic reaction.

In addition, the gasification step includes a reversible reaction that is exothermic towards the formation of carbon dioxide.

$$CO+2H_2O \text{ (vapor)}=CO_2+2H_2 \quad (3)$$

Moreover, there is carried out reaction were carbon monoxide and the water contained in the source material react, generating carbon dioxide and methane gas.

The smoldering combustion of organic material according to the invention is exothermic, which means that it maintains the combustion process as such, without an external heat source.

By employing the method and gasification plant according to the invention, several different types of aqueous, dry and solid or liquid waste or biomass can be processed without pretreatment.

The invention is described in more detail below, with reference to the appended drawings. In the drawings.

Figure 1:
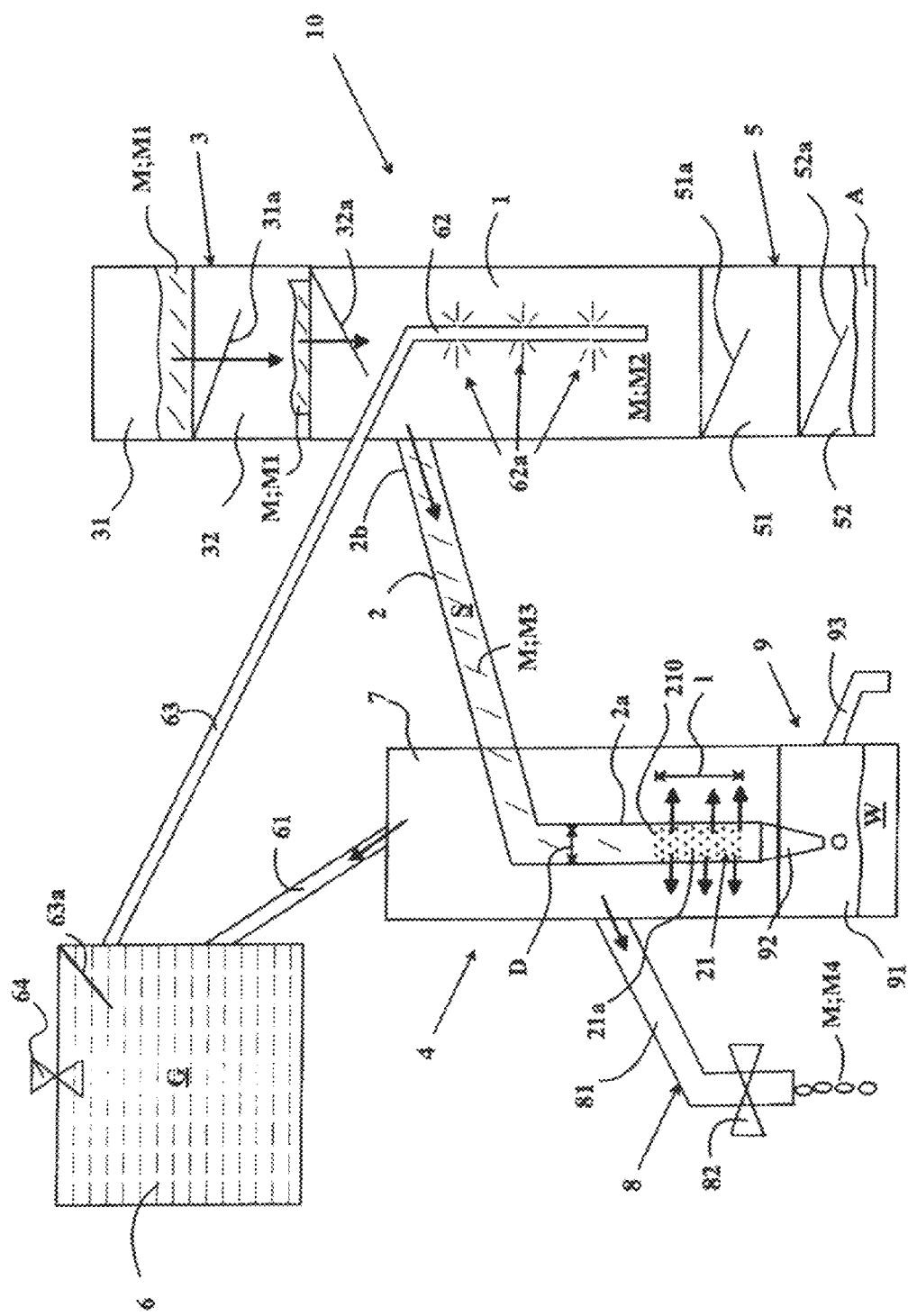
FIG. 1 is a schematical illustration of a gasification plant according to the invention.
Figure 2:
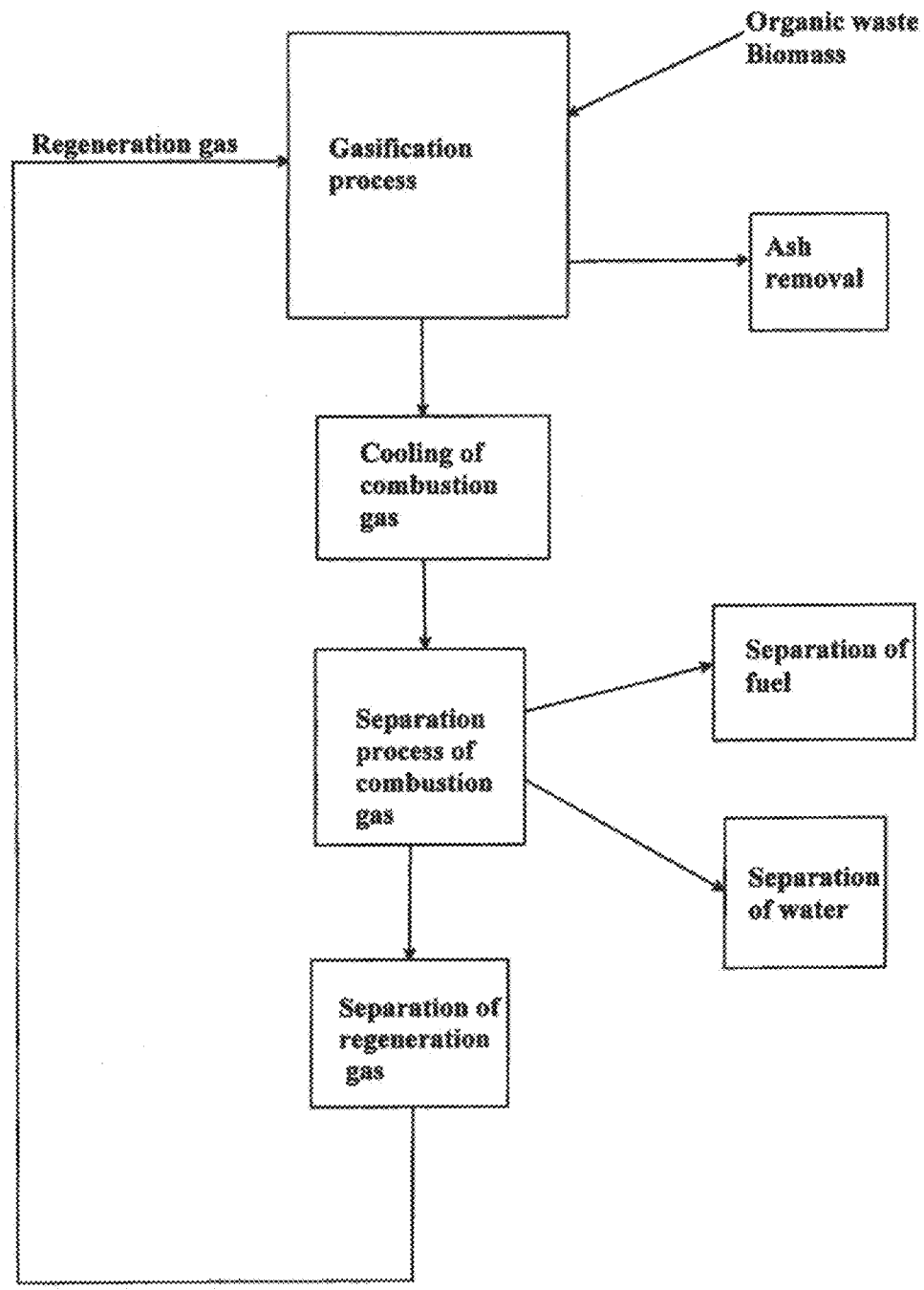
FIG. 2 is a flow diagram illustrating the operation of the gasification plant of FIG. 1

The basic structures and functions illustrated in FIGS. 1 and 2 are first briefly described in the specification below.

The main parts of the gasification plant shown in FIG. 1 are a combustion chamber 1, where the material M; M2 to be burned is gasified at overpressure, at a relatively low temperature (about 500-1,200° C. preferably 500-1,000° C.). The material M; M1 to be burned in the combustion chamber is fed in the combustion chamber 1 by feed equipment 3. To the combustion chamber 1, there are connected an ash removal chamber 5 meant for removing solid material, and a combustion gas pipe 2 meant for removing combustion gases. The combustion gas pipe 2 leads to combustion gas separating equipment 4 where the combustion gas S is separated to its components (water W, fuel M; M4, regeneration gas G). The combustion gas separating equipment 4 in turn includes a water recovery element 9 for collecting and removing the water W condensed from the combustion gas, and a combustion gas separating tank that contains a recovery element 8 for the fuel M; M4, as well as a as tank 6.

The purpose in the gasification method according to the invention is to produce liquid fuel M; M4 from organic material, such as organic waste or biomass, in a gasification process comprising the burning of organic material and the recovery of the solid gasification residue. Thus the method includes at least the following steps:

A) organic aqueous material is fed in the con combustion chamber 1;

B) oxygen-bearing pressurized regeneration gas is also fed in the combustion chamber 1;

C) a pressurized, continuous combustion process is maintained in the combustion chamber 1 without adding an external oxygen source or heat in the process, so that the gasification of organic material is carried out with the oxygen content of 0.1-1 of the stoichiometric oxygen content, wherein the oxygen maintaining the combustion and the overpressure and heat created in the combustion chamber 1 are completely derived from the pyrolysis of the regeneration gas G and/or the aqueous organic waste M; M1 fed in the combustion chamber 1, and from gasification reactions:

D) as created in the continuous gasification process taking place in the combustion chamber 1 is removed by means of an ash removal chamber 5, and the combustion gases S obtained from the gasification process, together with the solid particles M; M3 contained in the combustion gases S, are conducted to a separation process that takes place in the combustion gas separating equipment 4;

E) in the separation process, taking place in the separation equipment 4, the temperature of the combustion gas S is dropped below the flash point Fp of the compounds contained in the combustion gas and below the water condensation point, the condensation water W contained in the combustion gas S is removed by the water recovery element 9, the liquid fuel M; M4 is recovered from the combustion gas S, and the regeneration gas G contained in the combustion gas is completely or partly conducted back to the combustion chamber 1, to maintain smoldering combustion.

The invention is described in even t more detail below, with reference to the brief description of the invention above, and to FIGS. 1 and 2, at the same time pointing out more precisely the advantages that are achieved by the described gasification process and the described gasification plant.

In gasification process according to the invention, there is advantageously maintained an overpressure a suitable overpressure being 5-50 bar, preferably over about 8 bar. The same overpressure is maintained in all units of the gasification plant 10, i.e. in the combustion chamber 1, the combustion gas separation equipment 4 and the as tank 6, including the conduits leading to the gas tank. Because an overpressure is maintained in the units 1, 4 and 6 of the gasification plant 10, the material flow entering the process (the supplied maternal M; M1) and the material flows leaving the process (ash A, fuel M; M4 and water W) are all conducted through pressure balancing.

For pressure balancing, the feed elements 3 include a feed tank 31 for fresh material M; M1, and an intermediate tank 32. In between the feed tank 31 and the intermediate tank 32, there is provided a feed tank shutter 31a that can be opened and closed for batching the fresh material M; M1 to the intermediate tank 32 from the feed tank 31. In between the intermediate tank 32 and the combustion chamber 1, there is likewise provided an intermediate tank shutter 32a that can be opened and closed. The intermediate tank shutter 32a can be closed in a gas-tight manner, so that it prevents the gas pressure prevailing in the combustion chamber 1 from affecting the fresh material batch M; M1 fed inside the intermediate tank 32. Now the fresh material batch M; M1 can be brought from the feed tank first to the intermediate tank 32 by opening the feed tank shutter, and by simultaneously keeping the shutter 32a between the intermediate tank 32 and the combustion chamber 1 closed. Thereafter the pressure between the intermediate tank 32 and the combustion chamber 1 is balanced by closing the shutter 31a separating the intermediate tank 32 from the feed tank 31, whereafter the material batch M1 can be freely shifted from the intermediate tank 32 to the combustion chamber 1.

A similar type of press e balancing system is also arranged between the ash removal chamber 5 and the combustion chamber 1. The ash removal chamber 5 comprises an ash silo 51 and an ash bin 52. In between the ash silo 51 and the ash bin 52, there is arranged a gas-tight ash bin shutter 52a, and by opening and closing said shutter, the ash bin can respectively be separated from the ash silo, and a flow passage can be opened between the ash bin 52 and the ash silo 51. In between the ash silo 51 and the combustion chamber 1, there is arranged an ash silo shutter 51a that opens the connection between the combustion chamber 1 and the ash silo 51, when it is open, and separates the ash silo 51 from the combustion chamber 1, when it is closed. The ash A is first brought to the ash silo 51 by opening the shutter 51a between the combustion chamber 1 and the ash silo 51, and by simultaneously keeping the shutter 52 between the ash silo and the ash bin closed. Thereafter the shutter 51a s closed for separating the ash silo 51 from the combustion chamber 1. When the passage connection between the ash silo 51a and the combustion chamber 1 has been closed, the shutter 52a between the ash silo 51 and the ash bin 52 can be opened for transferring the ash to the ash bin 52.

A long combustion gas pipe 2 leads from the combustion chamber 1 to the combustion gas separating equipment 4. In the combustion gas pipe 2, the purpose is to drop the temperature of the combustion gas S, entering the combustion gas pipe from the combustion chamber 1, down to a level where the water fraction, the fuel fraction and the regeneration gas can be separated from the combustion gas by means of the combustion gas separating equipment 4. For this purpose, that end 2b of the combustion gas pipe 2 that is located on the side of the junction of the combustion gas pipe 2 and the combustion chamber 1 is often, provided with cooling (not illustrated) for preventing the combustion gases from flashing. At the other end 2a of the combustion gas pipe, i.e. at the other, free end 2a of the combustion gas pipe when viewed from the combustion chamber 1, a certain area 21a of the pipe 2 is provided with relatively small apertures 21, the diameter of each aperture 210 being d. When the (outer) diameter of the combustion gas pipe is D, the surface area of this area 21a of the free end of the combustion gas pipe is defined by the length of said area in the lengthwise direction of the combustion gas pipe, as well as by the combustion pipe diameter D, in which case the surface area=$\pi*D*l$, The diameter d of each aperture 210, and the surface area of the area 21a provided with apertures, is mainly dependent on the capacity of the gasification plant, so that as the volume flow of the combustion gas S flowing through the combustion gas pipe 2 is increased, the diameter d of each aperture 210, as well as the surface area of the area 21a provided with apertures 21, must be increased, either by extending the diameter D of the combustion gas pipe or the length l of the area 21a.

At the end of the free end 2a of the combustion gas pipe 2, there is connected a (condensing) water removal element 9, comprising a conical tapered end 92, a water tank 91 and a condensation water outlet valve 93. The purpose is to collect free water W contained in the combustion gas, i.e. water that is not bound in fuel, in the water tank 91. Now the temperature of the combustion gas S flowing inside the combustion gas pipe at the free end 2a of the combustion gas pipe 2 must be lower than the water boiling point at the pressure prevailing at each moment inside the pipe 2. The applicant has tested the gasification process according to the invention, so that the pressure prevailing inside the combustion gas pipe 2 is about the same as the overpressure prevailing inside the combustion chamber, i.e. about 8 bar. Now the temperature of the combustion gas S at the end of the combustion gas pipe should be about 80-130° C., preferably 80-100° C., in order to ensure that the free water is condensed from the combustion gas as completely as possible. The condensation water W flows through the tapered end 92 of the free end 2a of the combustion gas pipe to the water tank 91, from which the collected water W is removed from time to time by opening a valve that leads to the water outlet pipe 93 arranged at the lower edge of the water tank.

The whole end part of the combustion gas pipe 2 including the free end 2a with the area 21a provided with apertures, all the way to the tapered end 92 used for collecting the condensation water, is brought to inside the combustion gas separation tank 7, in which separation tank 7 the regeneration gas G and the fuel M; M4 are separated. The combustion gas pipe 2 is connected to the separation tank 7 in a gas-tight manner both at the inlet point on the side of the combustion chamber and at the point where the tapered end 92 of the condensation water pipe is brought through the separation tank 7 and further to the water tank 91. At the lower edge of the separation tank 7, there is connected a fuel recovery element 8 comprising a fuel recovery pipe 81 and a shutter valve 82 connected to said pipe.

To the upper part of the separation tank 7, there is in turn connected, in a gas-tight manner, the regeneration gas inlet pipe 61 leading to the gas tank 6. Further, from the gas tank 6, a regeneration gas feed pipe 63 leads back to inside the combustion chamber 1. Also the feed pipe 63 is connected to the combustion chamber in a gas-tight manner, because the gas pressure inside the feed pipe should be as high or higher (about 8 bar) than the one prevailing in the combustion chamber. The passage of the regeneration gas G from the gas tank 6 to the inlet pipe 61 and further along the feed pipe 63 to the combustion chamber 1 can be controlled by a valve 63a that can be opened and closed. The free end of the feed pipe 63 is turned to run in the lengthwise direction of the combustion chamber 1, and it is formed as a nozzle element 62 by arranging a number of nozzles 62a that release gas from the nozzle element 62 in an approximately horizontal direction. A safety valve 64 is placed in the lid of the gas tank 6.

As the pressurized combustion gas S, having a temperature of about 80-130° C., preferably 80-100° C., is pressed through the apertures 21 provided in the area 21a of the combustion gas pipe 2, a vaseline-like, fuel M; M4 is simultaneously condensed therefrom. The fluid vaseline-like fuel M; M4 obtained in the separation tank 7 through the apertures 21 of the combustion gas pipe 2 is collected in the fuel recovery pipe 81, from which it can be at regular intervals collected and recovered to outside the separation equipment by opening the shutter valve 82 of the recovery pipe. At said temperature, uncondensed regeneration gas G is separated from the combustion gas flowing through the apertures 21, the composition of said gas G varying depending on the source material M; M1, and on the temperature in the combustion chamber 1. Part of the regeneration gas G is oxygen-bearing carbon monoxide and carbon dioxide, but there can also be present hydrogen, short-chain alkanes such as methane, and short-chain carbonyl compounds with a low boiling point. The regeneration gas G is carried through the inlet pipe 61 to be stored in the gas tank 6, from which it is transferred, when necessary, to the feed pipe 63 and blown through the nozzles 62a provided at the end of the feed pipe to the combustion chamber 1. The regeneration gas G serves in the combustion chamber 1 as the carrier of combustible materials to the combustion gas pipe 2 and as the maintainer of the combustion process, because it contains oxygen that is needed in said process.

The combustion process itself, taking place in the combustion chamber 1, is carried out as incomplete combustion (smoldering), because any external oxygen not fed in the combustion chamber, but all of the oxygen used in the combustion is derived either from the regeneration gas or from the organic waste or biomass M; M1 to be fed in the combustion chamber itself.

Mainly the smoldering combustion takes place according to the formulas (1)-(3) given above; as aqueous material M; M1 is brought in the gasification process, it is shifted from the fresh material feed tank 31 to the intermediate tank 32, and after pressure balancing, further to the combustion chamber 1.

In the combustion chamber 1, the fresh material M; M1 is first pyrolyzed, so that gases and vapor are volatized therefrom, and at the same time the carbon chains of the compounds contained in the material are broken up. Naturally the composition of the gases volatized from the material M; M1 is dependent on the composition of the material itself, but in case the material to be supplied is typical household waste—foodstuff and mixed waste—without metals, it contains, among others, compounds such as proteins, containing straight-chain aromatic hydrocarbons, carbonyl compounds; water; hydrogen and sulfur. Thereafter the dry, combustible material M; M2 pyrolyzed from the supplied material reacts with vapor and oxygen that are present in the combustion chamber 1. The material M; M2 is burned at the temperature 500-1200° C. by smoldering combustion, the content at the oxygen present in the reaction being below the stoichiometric content. Now there is created a relatively large quantity of carbon monoxide and hydrogen according to reaction (2b), because the carbon source is gasified into carbon monoxide and hydrogen owing to the effect of oxygen and vapor. Now the combustion gas obtained from a gasification process according to the invention contains, among the gaseous substances, mainly carbon monoxide, hydrogen and, depending on the source material, possibly also remarkable quantities of hydrogen sulfide and ammonia.

In the combustion gas S created in the combustion chamber 1, there also is transferred unreacted vapor derived from the product, as well as water, in the form of vapor, created in the reversible reaction (3) of hydrogen and carbon monoxide. When carbon source (organic waste or biomass) is fed in the gasification process, it is broken up to smaller units owing to the effect of heat, and the vapor is volatized and reacts with carbon dioxide in the gasification step. Moreover, the carbon source is during the process converted to compounds containing the carbonyl group (acids, aldehydes, ketones), the flash point and vaporizing point of these compounds being inversely proportional to the length of the carbon chain, so that the carbonyl compounds with a longer carbon chain have a lower boiling point. Moreover, aromatic hydrocarbons, such as phenols and waxes, are created during the process.

The converting products of the carbon source are also transferred, as carried along by the combustion gas S, further in the combustion gas pipe. As the temperature of the combustion gas S is in the combustion gas pipe S is dropped down to about 80-130 degrees, from the substances contained in the combustion gas G, the substances boiling at a low temperature are separated from the substances boiling at a higher temperature.

Now in the regeneration gas G, there are transferred ammonia, hydrogen sulfide, hydrogen, carbon monoxide and possible carbon dioxide, as well as the products from conversion and breaking up (for example short-chain alkanes and alkyl carbonyls).

On the other hand, long-chain breaking up and conversion products from the solid material M; M1 such as long-chain alkyls, alkyl carbonyls, aromatic hydrocarbons, long-chain fats and waxes are left in the fuel M; M4 to be separated from the combustion gas S.

The unreacted vapor left from the solids M; M1 supplied in the process, as well as the vapor derived from the reversible reaction (3), are partly transferred to the fuel, and partly they are removed by a water removal element 9 through the free end 2a of the combustion gas pipe 2 as condensation water W.

It was detected that the dry matter content of fuel M; M4 recovered from a process of the above describe type was 59.6% by weight, i.e. the water content thereof was 40.4% by weight. The fuel contained various different metal compounds, aromatic hydrocarbons defines, carboxylic acids and paraffin wax.

Only a few preferred embodiments of the invention have been described in the above specification, and for a person skilled in the art it is obvious that the gasification plant and method according to the invention can also be realized in many other ways within the scope at the inventive idea defined in the appended claims.

| REFERENCE NUMBERS | |
| --- | --- |
| Combustion chamber | 1 |
| Combustion gas pipe | 2 |
| Free end of pipe | 2a |
| Pipe end connected to combustion chamber | 2b |
| Apertures on exhaust pipe | 21 |
| Aperture | 210 |
| Aperture area on pipe | 21a |
| Length of aperture area | l |
| Diameter of combustion gas pipe | D |
| Combustion gas | S |
| Feed elements | 3 |
| Feed tank | 31 |
| Feed tank shutter | 31a |
| Intermediate tank | 32 |
| Intermediate tank shutter | 32a |
| Combustion gas separating equipment | 4 |
| Ash removal chamber | 5 |
| Ash silo | 51 |
| Ash silo shutter | 51a |
| Ash bin | 52 |
| Ash bin shutter | 52a |
| Ash | A |
| Gas tank | 6 |
| Feed pipe to combustion chamber | 63 |
| Feed pipe shutter valve | 63a |
| Free end of feed pipe, nozzle element | 62 |
| Nozzles of nozzle element | 62a |
| Inlet pipe to gas tank | 61 |
| Safety valve of gas tank | 64 |
| Separated gas, regeneration gas | G |
| Separation tank of combustion gas | 7 |
| Combustion gas | S |
| Fuel recovery element | 8 |
| Recovery pipe | 81 |
| Pipe shutter valve | 82 |
| Water recovery element | 9 |
| Water tank | 91 |
| Tapered end of combustion gas pipe | 92 |
| Water outlet pipe | 93 |
| Water | W |
| Gasification plant | 10 |
| Material to be fed in | M; M1 |
| Material to be burned | M; M2 |
| Material contained in combustion gas | M; M3 |
| Fuel | M; M4 |
| Flash point | Fp |

The invention claimed is:

1. A method for producing fuel from organic material in a gasification process including burning of organic material and recovery of a gasification residue, wherein the method comprises at least the following steps:
feeding an organic aqueous material and a pressurized regeneration gas into a combustion chamber, said regeneration gas containing oxygen;
combusting the regeneration gas and the organic aqueous material in the combustion chamber in a pressurized, continuous combustion process, without adding an external oxygen source or heat to the process, such that the combustion of organic material is carried out with an oxygen content of 0.1-1 of stoichiometric oxygen, and the oxygen maintaining the combustion and the overpressure and heat created in the combustion chamber are completely derived from:
the pyrolysis of at least one of the regeneration gas and the organic aqueous material fed into the combustion chamber, and
the gasification reactions between the organic aqueous material and the regeneration gas;
removing ash created in the continuous gasification process taking place in the combustion chamber; and
conducting combustion gases obtained from the gasification process and solid particles contained in the combustion gases to a separation process;
wherein, in the separation process, the temperature of the combustion gas is dropped below the flash point of the compounds contained in the combustion gas, as well as below the water condensation point; the condensation water contained in the combustion gas is removed, a liquid fuel is recovered from the combustion gas, and the regeneration gas contained in the combustion gas is conducted completely or partly back to the combustion chamber.

2. A method according to claim 1, wherein both the gasification process and the separation of combustion gas are carried out at overpressure.

3. A method according to claim 1, wherein the temperature of the combustion gas is in the separation process dropped below the combustion gas flash point to 80-130° C. for converting the fuel contained in the combustion gas to a liquid form, and for condensing the free water possibly contained in the combustion gas.

4. A method according to claim 1, wherein the organic material to be fed in the combustion chamber contains water at least 10% by weight.

5. A method according to claim 1, wherein the regeneration gas contains at least one of: carbon monoxide and carbon dioxide.

6. A method according to claim 5, wherein the regeneration gas also contains hydrogen gas or lower alkanes in a gaseous form, as well as possibly also short-chain alkyl carbonyl compounds and ammonia.

7. A method according to claim 5, wherein the aqueous organic material to be fed in the combustion chamber and the oxygenous gases contained in the regeneration gas, are allowed to react together at the temperature of over 400° C. in an exothermic gasification reaction, so that in said reaction, there is created combustion gas to be conducted out of the combustion chamber, which gasification reaction at the same time maintains in the combustion chamber a given overpressure and temperature that ensure a continuous operation for the gasification reaction.

8. A method according to claim 1, wherein from the combustion gas, there are first separated regeneration gases and liquid fuel by pressing the combustion gases through apertures provided at the end of the combustion gas pipe, whereafter the free water separated from the combustion gas is condensed.

9. A method according to claim 1, wherein the fuel created in the process contains aromatic hydrocarbons, olefines, waxes, organic carboxylic acids and water.

10. A method according to claim 9, wherein the dry matter content in the fuel is 40-60% by weight, and the calorific intensity is 50-70 MJ/kg.

11. A method according to claim 9, wherein the fuel also contains metals and non-metals obtained from organic aqueous waste.

* * * * *